United States Patent Office 3,292,250
Patented Dec. 20, 1966

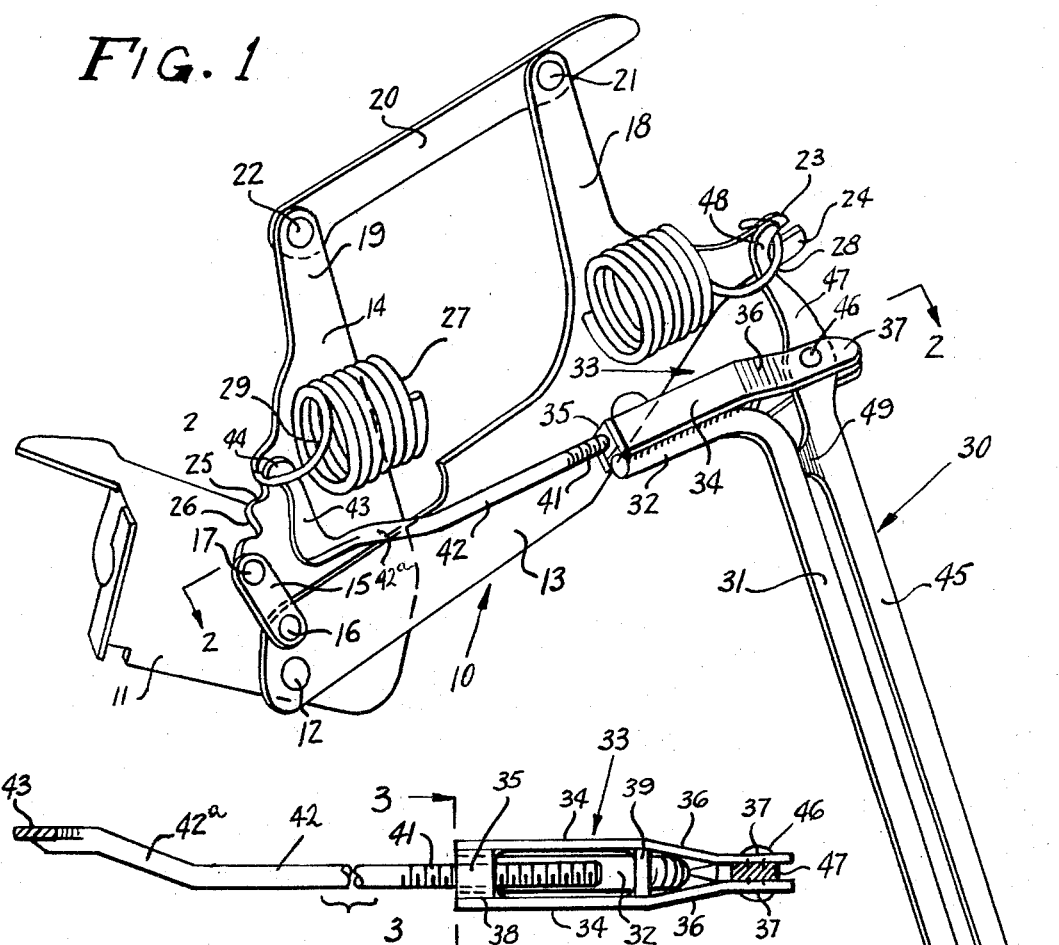
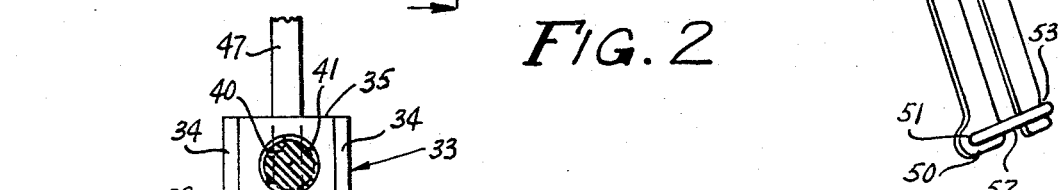
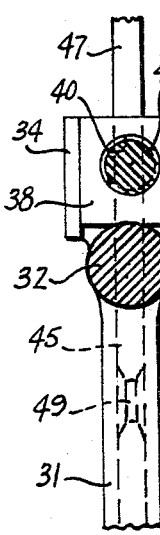

3,292,250
SPRING EXPANDER
Robert Augustus Miller, 143 W. Granada Ave.,
Hershey, Pa. 17033
Filed Mar. 23, 1965, Ser. No. 442,099
5 Claims. (Cl. 29—227)

This invention relates to a spring expander, and has particularly adaptability to a device employed in releasing and replacing springs employed in conjunction with automobile hood hinges.

A primary object of this invention is the provision of a device of this character which may be employed to release the tension exerted by a spring, particularly one employed on an automible hood hinge assembly so that the spring might be removed for work on the hinge, or other purposes, and similarly expanded for the purpose of replacement thereon after completion of the work with a minimum of time, effort and difficulty.

An additional object of the invention is the provision of a device of this character which is readily adjustable to accommodate springs of different lengths.

A further object of the invention is the provision of such a device wherein the expansion or extension of the spring is limited to the extent necessary to remove or replace the same, precluding inadvertent over-extension of the spring so as to injure its resilient qualities in the assembly for which it is designed.

A further object of the invention is a provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and disclosed in the accompanying drawing wherein:

FIGURE 1 is a perspective side elevational view of one form of spring expander constructed in accordance with the instant invention shown in position expanding the spring of a conventional automobile hood hinge assembly, portions of the spring being broken away for clarity of illustration.

FIGURE 2 is an enlarged sectional view taken substantially along the line 2—2 of FIGURE 1 as viewed in the direction indicated by the arrows, and FIGURE 3 is an enlarged sectional view taken substantially along the line 3—3 of FIGURE 2 as viewed in the direction indicated by the arrows, parts thereof being broken away for clarity of illustration.

Similar reference characters refer to similar parts thoughout the several figures of the drawing.

Having reference now to the drawings in detail, there is generally indicated at 10 an automobile hood hinge assembly, which comprises a first leaf 11 to which is pivotally connected, as by a pivot 12, a second hinge leaf 13. An intermediate hinge portion 14 is also secured to the assembly, and linked to hinge leaf 13 by a link 15 pivotally connected at 16 and 17 to the portions 13 and 14.

The leaf members 13 and 14 are each provided with extensions 18 and 19 respectively, which are connected by a link 20 pivoted thereto by means of pivots 21 and 22. A notch 23 in an extending portion 24 of leaf 13 is aligned selectively with one of a series of notches 25, 26 in the opposite side of member 14, and a tension spring 27 having end loops 28 and 29 respectively extends between the notch 23 and the selected notch 25 or 26, the arrangement thus being such as to bias leaf 13 upwardly relative to leaf members 11 and 14, which, in the normal assembly of the device tend to raise the hood. The specific hinge assembly herein shown and described is intended to be merely illustrative, and comprises no part of the instant invention.

The spring expander of the instant invention is generally indicated at 30, and includes a first elongated handle member 31, which at one end is provided with a right angled extension 32. Extension 32 has welded, or otherwise suitably secured thereto a yoke generally indicatd at 33, which includs a pair of arms 34 extending oppositely from a bight portion 35, the arms 34 including offsets 36, which terminate in free end portions 37. Reinforcing extensions 38 and 39 connect portions 34 at suitably spaced intervals.

Bight portion 35 is provided with a centrally positioned threaded bore or opening 40, into which extends the threaded end 41 of a rod portion 42. Rod or rod portion 42 has an offset 42a thereon and a flat perpendicular extremity 43 which is offset at right angles thereto, and terminates in a hook portion 44 adapted to engage with one end member 29 of spring 27.

It will thus be seen that effective length of rod 42 may be varied merely by rotating the same, to thread the rod inwardly or outwardly relative to bight 35 of member 33.

A second handle member 45 is provided, and pivoted as on a pivot 46 between the free ends 37 of side members 34. A portion 47 of handle member 45 extending above pivot 46 is formed into a hook 48, which is adapted to engage the other end portion 28 of spring 27. A stop 49 is formed on the inner side of handle 45, adjacent handle 31, and serves to limit the movement of the handle members toward each other, thus precluding excessive extension of spring 27, which might result in stretching the same so that it would not perform its normal function.

The lower end of handle member 31 has an outwardly protruding lug 50 having a bore 51 therein through which extends a link 52, which is adapted to ben engaged over the end of handle member 45 and seat in a notch 53 when the handle members are compressed, so as to hold the parts is assembled relation, and hold spring 27 extended to a degree sufficient to remove it from its associated notches 23 and 25 and 26. The arrangement is such that the spring can be extended only to a distance sufficient to permit its ready removal from its associated end notches, or replacement therein. The link 52 will serve to hold the spring in extended position so that it may be replaced on the hinge as desired, and by releasing the link 52 the handle 45 may pivot outwardly relative to handle 31 to release the tension on spring 27 and permit it to resume its normal relationship to the hinge.

From the foregoing, it will now be seen that there is herein provided an improved hinge expander, which is particularly adaptable to the purposes specified, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A spring expander comprising a handle member having a right angled extension at one end, a yoke having extending free ends and a bight secured to said extension, the free ends of said yoke extending beyond the intersection of said handle and said extension, a second handle pivotally mounted between said free ends, and having a portion extending beyond the pivot point defining a hook for engaging one end of a spring, a rod secured to the bight of said yoke and an offset portion at the other end of said rod defining a second hook for engaging the other end of a spring disposed in parallelism to said first mentioned hook.

2. The structure of claim 1 wherein one of said handles is provided with a stop member, limiting the extent to which said spring may be extended by compression of said handles.

3. The structure of claim 1 wherein one end of one handle is provided with a loop engageable over the adjacent end of the other handle, to retain said handle and hence the spring engaging hook in spring extended position.

4. The structure of claim 1 wherein said rod is adjustably secured to said yoke.

5. The structure of claim 1 wherein said bight has a threaded opening therein and said rod has a threaded end engaging in said opening adjustably securing said rod to said bight of said yoke.

References Cited by the Examiner
UNITED STATES PATENTS 1,951,953  3/1934  Tollonitsch _____ 29—268 X
2,522,611  9/1950  Guth _____ 29—227

WILLIAM FELDMAN, *Primary Examiner*

J. PETERS, *Assistant Examiner.*